July 28, 1936.  T. L. DAILEY  2,048,999
MEAT HOLDING DEVICE
Filed July 12, 1935  2 Sheets-Sheet 1
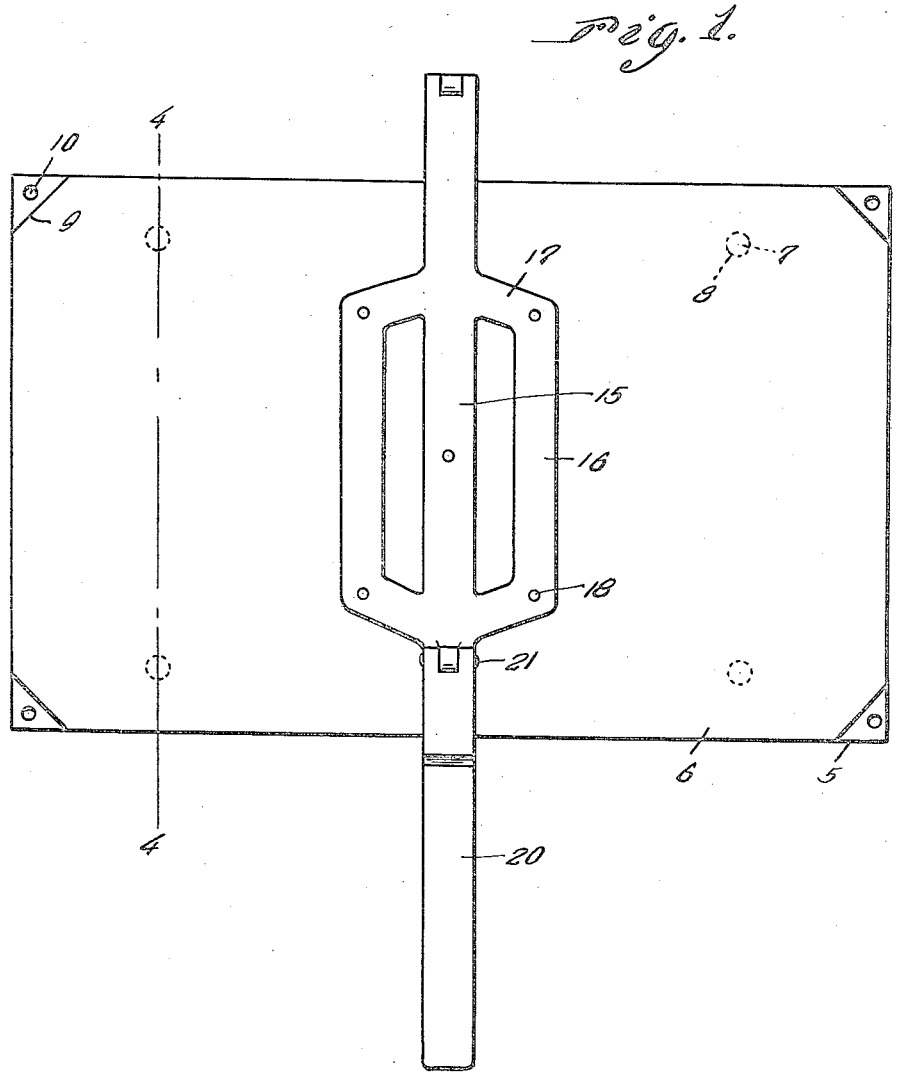
Inventor
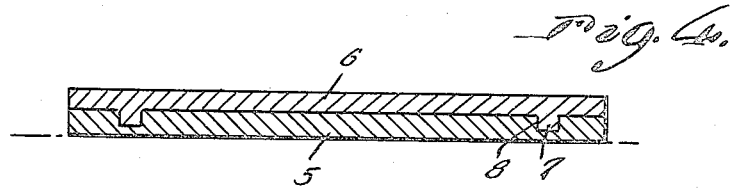
By *Clarence A. O'Brien*
Attorney

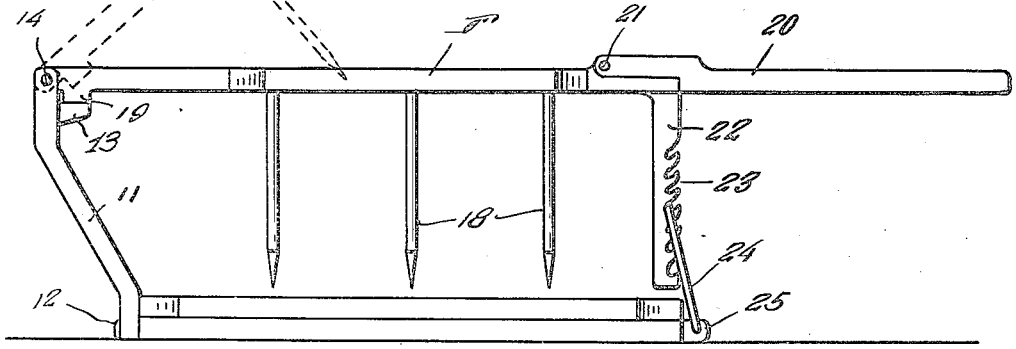
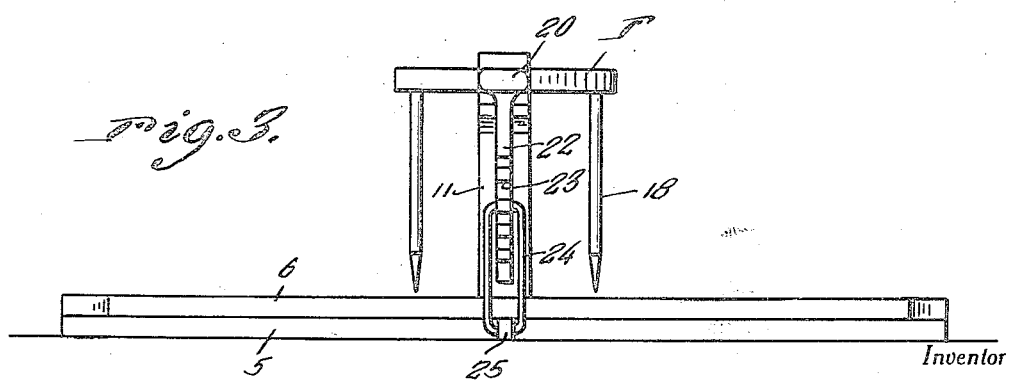

Patented July 28, 1936

2,048,999

UNITED STATES PATENT OFFICE 2,048,999

MEAT HOLDING DEVICE

Thomas Leo Dailey, Lafayette, La.

Application July 12, 1935, Serial No. 31,087

1 Claim. (Cl. 146—216)

The present invention relates to a meat holding device and one of the prime objects thereof is to provide a device for rigidly holding or supporting a body of meat while it is being manually sliced or carved, the arrangement of parts being such as to permit of their convenient manipulation to hold bodies of meat of widely different sizes and shapes as well as to permit the easy release and readjustment thereof.

Another very important object of the invention resides in the provision of a meat holding device of this nature which is comparatively simple in its construction, inexpensive to manufacture, strong and durable, easy to manipulate, thoroughly efficient and reliable in use and otherwise well adapted to the purpose for which it is designed.

Another more specific object of the invention resides in the provision of a meat holding device of this nature including a base having a soft metal plate mounted thereon cooperable with prongs or pins depending from a swingably mounted frame.

With the above and numerous other objects in view as will appear as the description proceeds, the invention consists in certain novel features of construction, and in the combination and arrangement of parts as will be hereinafter more fully described and claimed.

In the drawings:

Figure 1 is a top plan view of a device embodying the features of my invention.

Figure 2 is a side elevation thereof.

Figure 3 is an end elevation thereof.

Figure 4 is a detail sectional view taken substantially on the line 4—4 of Figure 1.

Referring to the drawings in detail, it will be seen that the numeral 5 denotes a metallic rectangularly shaped base plate on which is superimposed a soft metal plate 6 provided with projections 7 receivable in pockets 8 of the plate 5. The corners of the soft metal plate 6 are cut away as indicated at 9 and the corners of the plate 5 are provided with openings 10 so that the same may be fastened by bolts, screws or the like to a suitable supporting structure. A bracket arm 11 is fixed in any suitable manner as indicated at 12 to the central portion of one end of the plate 5 and inclines upwardly and outwardly therefrom. A frame F is hingedly connected as at 14 with the upper end of the bracket arm 11. The preferred construction of the frame F comprises an elongated bar 15 and relatively short side bars 16 connected with intermediate portions of the bar 15 by inwardly directed extensions 17. The frame is preferably cast integrally and the frame is provided with a plurality of downwardly disposed pins 18 suitably arranged. The arrangement shown by way of example includes four of the pins in four of the corners of the frame and a fifth pin is in the center of the bar 15. The arm 11 is provided with a lug 13 and the bar 15 is provided with a lug 19 to abut therewith so that a proper tension may be obtained. A handle 20 is hingedly connected as at 21 with the bar 15 at the free end thereof and may be disposed in the normally co-extensive position indicated to advantage in Figure 2 but may be swung up out of the way when not in use. Depending from the free end of the bar 15 is a ratchet bar 22 having teeth 23. A link 24 is swingably engaged as at 25 with the end of the base plate 5 remote from the bracket arm 11 and may be swung upward into engagement with any of the teeth 23 for holding the pins securely in the body of meat mounted on the soft metal plate 6.

In operation, a quarter or portion of meat is placed on the plate 6 and the frame is swung downwardly so that the pins pierce the meat and the link 24 is engaged with one of the teeth 23 of the ratchet bar 22 and thus the meat is secured in place and may be cut as desired and may be easily released and fastened again as may be required to obtain the desired cutting. The members 13 and 19 limit the downward movement of the frame F and prevent the pins 18 from striking the plate 6. By making this plate 6 of soft metal the knives or saws, which are used in cutting the meat, are prevented from being dulled when they come in contact with said plate.

It is thought that the construction, operation, utility and advantages of this invention will now be quite apparent to those skilled in this art without a more detailed description thereof.

The present embodiment of the invention has been described in considerable detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described the invention, what is claimed as new is:

A meat holding device of the class described including a base plate, a soft metal plate mounted thereon and having its upper face forming a rest for the meat, an arm rising from one end of the base plate and fixed thereto, a frame hingedly connected with the upper end of the arm, piercing pins projecting from the frame, a ratchet bar depending from the free end of the frame, a link pivotally connected with the other end of the base plate and engageable with the ratchet bar, a handle bar hingedly connected adjacent the free end of the frame, said frame including an elongated bar and a pair of short bars placed one on each side of the intermediate part of the elongated bar spaced from the long bar, and inwardly directing parts connecting the ends of each short bar with the long bar, and stop means between the arms and the frame for limiting downward movement of the frame to prevent the pins from engaging the soft metal plates.

THOMAS LEO DAILEY.